(12) United States Patent
Wen et al.

(10) Patent No.: US 7,677,644 B2
(45) Date of Patent: Mar. 16, 2010

(54) REAR BODY PANEL FOR A GOLF CAR

(75) Inventors: Jing Wen, Evans, GA (US); Donald S. Hanson, Evans, GA (US)

(73) Assignee: Textron, Inc., Providence, RI (US)

( * ) Notice: Subject to any disclaimer, the term of this patent is extended or adjusted under 35 U.S.C. 154(b) by 0 days.

(21) Appl. No.: 11/966,301

(22) Filed: Dec. 28, 2007

(65) Prior Publication Data

US 2009/0108632 A1 Apr. 30, 2009

Related U.S. Application Data

(60) Provisional application No. 61/001,319, filed on Oct. 31, 2007.

(51) Int. Cl.
*B62D 25/02* (2006.01)
(52) U.S. Cl. .............. 296/187.11; 296/63; 296/193.08
(58) Field of Classification Search .................. 296/63, 296/182.1, 64, 37.1, 37.16, 193.08, 187.11; 280/DIG. 5
See application file for complete search history.

(56) References Cited

U.S. PATENT DOCUMENTS

| 2007/0152463 A1* | 7/2007 | Hardy et al. ............... 296/37.1 |
| 2007/0284908 A1* | 12/2007 | Ball et al. .................... 296/104 |
| 2008/0136215 A1* | 6/2008 | Houston .................. 296/186.1 |

FOREIGN PATENT DOCUMENTS

WO 2004/067360 A1 8/2004

* cited by examiner

*Primary Examiner*—Joseph D Pape
(74) *Attorney, Agent, or Firm*—Harness, Dickey & Pierce, P.L.C.

(57) ABSTRACT

A rear body panel for a golf car includes a seat support portion and a bag well portion disposed rearward from the seat support portion. The rear body panel also includes a pair of wheel wells disposed on opposite sides of the bag well portion. The seat support portion includes a discontinuous recessed flange, a lower end trim edge, and at least one tab for limiting movement of the rear body panel on the golf car. Stiffening ribs are also included adjacent the wheel wells, and hand hold apertures are further included. The bag well portion includes a front wall portion, a pair of outwardly sloped side walls, and a floor portion with an impact absorption feature.

12 Claims, 4 Drawing Sheets

REAR BODY PANEL FOR A GOLF CAR

CROSS-REFERENCE TO RELATED APPLICATIONS

This application claims the benefit of the "Rear Body Panel for a Golf Car" application filed provisionally as Ser. No. 61/001,319, on Oct. 31, 2007. The disclosure of the above application is incorporated herein by reference.

FIELD

The present disclosure relates to a golf car and, more particularly relates to a rear body panel for a golf car.

BACKGROUND

The statements in this section merely provide background information related to the present disclosure and may not constitute prior art.

Golf cars provide transportation for persons around a golf course or other area. The body of a golf car typically includes a frame, seating, and a variety of panels affixed to the frame. The panels can be of a variety of shapes for supporting components of the car and adding aesthetic appeal to the vehicle. Also, these panels can include various features, such as a bag well for storage of golf bags for added convenience.

However, these panels can be brittle and can fracture easily due to, for instance, excessive loads experienced during vehicle impact. Also, these panels are relatively large and can be unwieldy during assembly. Furthermore, bag wells are often too small to accommodate larger golf bags with full pockets or other larger cargo.

SUMMARY

A rear body panel for a golf car is disclosed. The rear body panel includes a seat support portion and a bag well portion disposed rearward from the seat support portion. The rear body panel also includes a pair of wheel wells disposed on opposite sides of the bag well portion. The bag well portion includes a front wall portion, a pair of side walls and a floor portion. The floor portion includes an elongated slot therein. The elongated slot provides impact absorption for the rear body panel.

A rear body panel for a golf car is also disclosed that includes a seat support portion and a bag well portion disposed rearward from the seat support portion. The rear body panel further includes a pair of wheel wells disposed on opposite side of the bag well portion. The bag well portion includes a front wall portion, a pair of side walls and a floor portion. The floor portion includes an impact absorption feature therein. The impact absorption feature provides resilient deflection for impact absorption for the rear body panel.

In another aspect, a rear body panel for a golf car is disclosed, which includes a seat support portion and a bag well portion disposed rearward from the seat support portion. The rear body panel also includes a pair of wheel wells disposed on opposite sides of the bag well portion. The seat support portion includes an opening therein, and the opening is partially surrounded by a recessed flange portion. The recessed flange portion is discontinuous at a rear portion of the opening.

Furthermore, a rear body panel for a golf car is disclosed, which includes a seat support portion and a bag well portion disposed rearward from the seat support portion. The rear body panel also includes a pair of wheel wells disposed on opposite sides of the bag well portion. The seat support includes an opening therein, and the opening includes a recessed flange portion. The bag well portion and the recessed flange portion of the seat support portion includes stiffening ribs at a location adjacent to each of the wheel wells.

Additionally, a rear body panel for a golf car is disclosed, which includes a forward seat support portion and a rearward bag well portion disposed rearward from the seat support portion. The rear body panel further includes an intermediate body portion disposed between the seat support portion and the bag well portion. Additionally, the rear body panel includes a pair of wheel wells disposed on opposite sides of the bag well portion. The intermediate body portion includes at least one aperture sized for receiving a person's hand therein. The aperture facilitates handling of the rear body panel.

In still another aspect, a rear body panel for a golf car is disclosed which includes a seat support portion and a bag well portion disposed rearward from the seat support portion. The rear body panel also includes a pair of wheel wells disposed on opposite sides of the bag well portion. The bag well portion includes a front wall portion, a pair of side walls, and a floor portion. The side walls are each sloped outward so that a first distance between a top of the side walls is greater than a second distance between a bottom of the side walls. The first distance is at least 25% larger than the second distance.

In an additional aspect, a rear body panel for a golf car is disclosed which includes a seat support portion and a bag well portion disposed rearward from the seat support portion. The rear body panel also includes a pair of wheel wells disposed on opposite sides of the bag well portion, and the seat support portion includes a trim edge at a lower end thereof. The trim edge extends outward from the seat support portion.

Furthermore, a rear body panel for a golf car is disclosed, which includes a seat support portion and a bag well portion disposed rearward from the seat support portion. The rear body panel also includes a pair of wheel wells disposed on opposite sides of the bag well portion. The seat support portion includes at least one tab extending downward from a lower end thereof for limiting movement of the rear body panel on the golf car.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
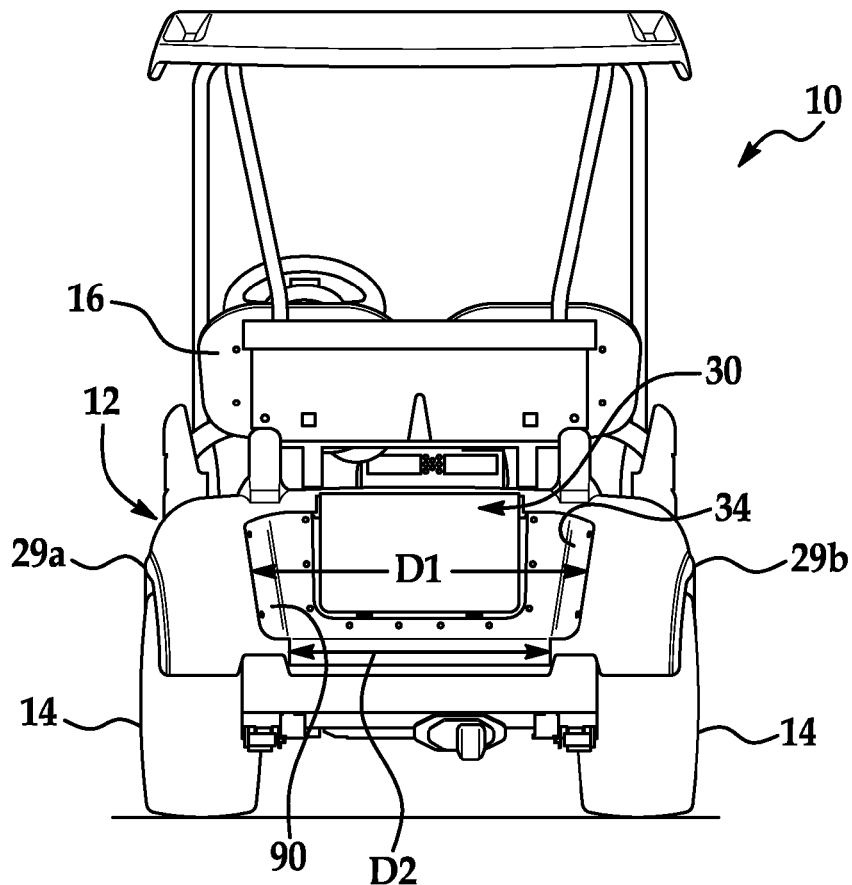
FIG. 1 is a rear view of a golf car with a rear body panel according to the present disclosure.

Referring initially to FIG. 1, a golf car 10 is shown with a rear body panel 12. The rear body panel 12 is coupled to the rear portion of the golf car 10. The rear body panel 12 is positioned over the rear wheels 14 of the golf car 10 and underneath the seat 16 of the golf car 10. The rear body panel 12 includes several features which will be described in greater detail below.

The rear body panel 12 can be a uniform, integral, thin-walled member. Also, the rear body panel 12 can be made out of a polymeric material. Furthermore, the rear body panel 12 can be made through an injection molding process.

Figure 2:
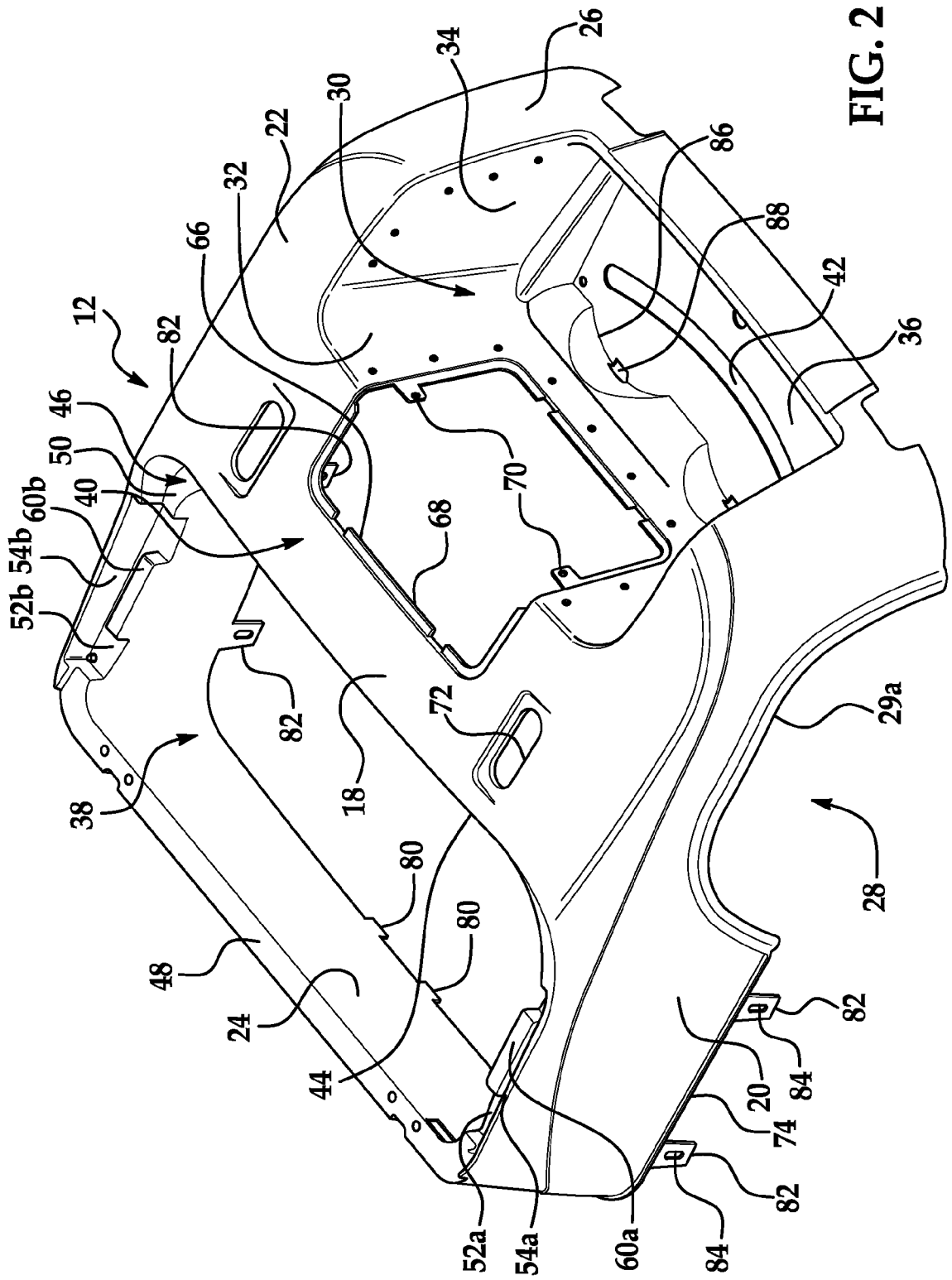
FIG. 2 is a perspective view of the rear body panel of FIG. 1.
Figure 3:
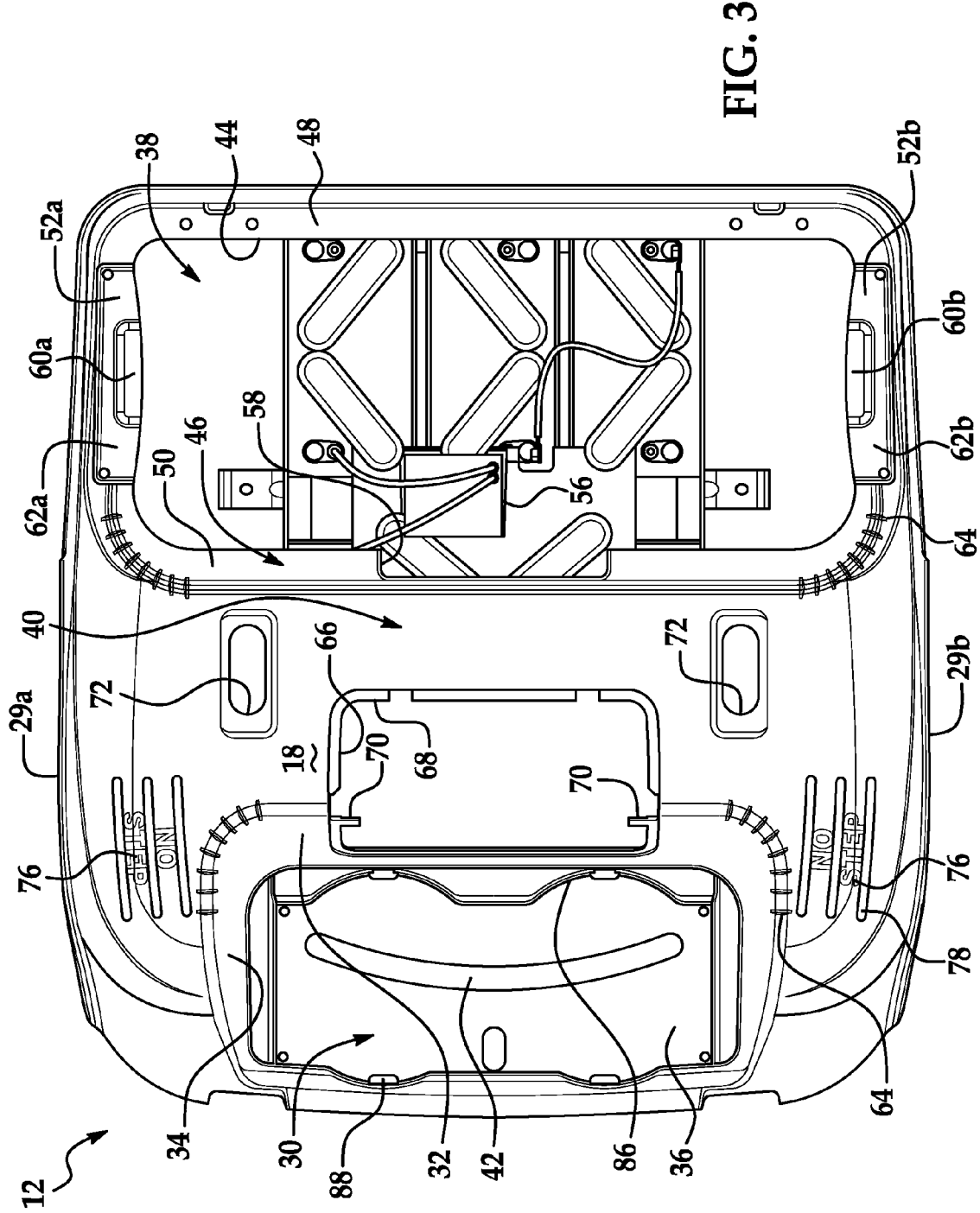
FIG. 3 is a top view of the rear body panel of FIG. 1.

Referring now to FIGS. 2 and 3, the rear body panel 12 generally includes a top member 18, a first side wall 20 extending downward from the top member 18, and a second side wall 22 extending downward from the top member 18 on a side opposite to the first side wall 20. Also, the rear body panel 12 generally includes a front wall 24 extending between the side walls 20, 22 and a rear wall 26 extending between the side walls 20, 22 on an end of the top member 18 opposite the front wall 24. Accordingly, the rear body panel 12 has a generally hollow box shape with an open bottom end 28.

The rear body panel 12 also includes a first wheel well 29a and a second wheel well 29b (FIG. 1). The first wheel well 29a is an arcuate cutout provided on the first side wall 20, and the second wheel well 29b is an arcuate cut out provided on the second side wall 22. The wheel wells 29a, 29b provide clearance for the wheels 14 of the golf car 10 as shown in FIG. 1.

The rear body panel 12 further includes a bag well portion generally indicated at 30. The bag well portion 30 is disposed at a rearmost end of the rear body panel 12 between the wheel wells 29a, 29b. More specifically, the bag well portion 30 includes a front wall portion 32, which extends downward from the top member 18, a pair of side walls 34, which extend downward from the top member 18 on opposite sides of the front wall portion 32, and a floor portion 36, which extends horizontally between the front wall portion 32 and each side wall 34. The floor portion 36 is spaced at a distance from the top member 18 of the rear body panel 12. The bag well portion 30 provides a storage area for golf bags and other items as well be discussed in greater detail below.

The rear body panel 12 further includes a seat support portion generally indicated at 38. The seat support portion 38 is disposed forward from the bag well portion 30. The seat 16 (FIG. 1) is positioned over and is supported by the seat support portion 38.

The rear body panel 12 further includes an intermediate body portion 40. The intermediate body portion 40 is disposed between the seat support portion 38 and the bag well portion 30.

In the embodiment shown, the rear body panel 12 includes an impact absorption feature, such as an elongated slot 42 included in the floor portion 36 of the bag well portion 30. The slot 42 is arcuate in shape such that its midpoint is further rearward than its ends. Also, the elongated slot 42 is centered on the rear body panel 12. Furthermore, the slot 42 has a length at least one-half a width of the floor portion 36 of the bag well portion 30. The slot 42 provides impact absorption for the rear body panel 12. More specifically, if a vehicle or other object impacts the rear body panel 12 adjacent the rear wall 26, the slot 42 will allow resilient deflection of the floor portion 36 to thereby absorb energy of the impact. Therefore, the rear body panel 12 is less likely to fracture, and the operating life of the rear body panel 12 is improved.

Furthermore, in the embodiment shown, the rear body panel 12 includes an opening 44 in the seat support portion 38. The opening 44 is rectangular in shape and is elongated in the cross vehicle direction. The opening 44 is surrounded by a flange 46. In the embodiment shown, the flange 46 is at least partially recessed below the top member 18 of the rear body panel 12. The flange 46 provides support for the seat 16 of the golf car 10.

In the embodiment shown, the flange 46 includes a front portion 48, a rear portion 50, and side portions 52a, 52b provided at opposite sides of the rear body panel 12. Also, side walls 54a, 54b extend vertically from the side portions 52a, 52b of the flange 46.

As shown in FIG. 3, the opening 44 in the seat support portion 38 provides access to various components stored below the rear body panel 12. In one embodiment, at least one battery 56 is stored below the rear body panel 12, and the opening 44 allows for access to the battery 56.

Also, in the embodiment shown in FIG. 3, the recessed portion of the flange 46 is discontinuous at a rear portion of the opening 44. More specifically, the rear portion 50 of the flange 46 includes a cut out 58, which is rectangular in shape. The cut out 58 allows for watering of the battery 56 and/or additional access to the components stored below the rear body panel 12.

The rear body panel 12 also includes rails 60a, 60b, each extending vertically from a respective side portion 52a, 52b of the flange 46. Also, the rails 60a, 60b are surrounded by depressions 62a, 62b formed in the respective side portions 52a, 52b of the flange 46. The rails 60a, 60b and the depressions 62a, 62b allow for proper positioning and retention of the seat 16 of the golf car 10.

In the embodiment shown in FIG. 3, the rear body panel 12 further includes a plurality of stiffening ribs 64 adjacent each wheel well 29a, 29b. In the embodiment shown, stiffening ribs 64 are included adjacent the flange 46, near the intersection between the rear portion 50, and the side portion 52a, 52b. Furthermore, stiffening ribs 64 are included adjacent the wheel well portion 30 near the intersection between the top member 18 and the front and side wall portions 32, 34 of the bag well portion 30. The stiffening ribs 64 add additional structural strength to the rear body panel 12 such failure of the rear body panel 12 is less likely and such that the operating life of the rear body panel 12 is improved.

Additionally, the rear body panel 12 includes an intermediate opening 66 through the top member 18 and the front wall portion 32 of the bag well portion 30. The intermediate opening 66 is generally rectangular and is elongated in the cross-vehicle direction. The intermediate opening 66 includes a recessed flange 68, which is discontinuous. Also, the rear body panel 12 includes a plurality of tabs 70 which extend toward the center of the intermediate opening 66. The intermediate opening 66 provides access for components underneath the rear body panel 12, such as a motor controller (not shown).

Furthermore, the rear body panel 12 includes at least one aperture 72 extended through the intermediate body portion 40. The apertures 72 are sized for receiving a person's hand therein. In the embodiment shown, the rear body panel 12 includes an aperture 72 on both sides of the intermediate opening 66. During handling of the rear body panel 12, a person can hold the rear body panel 12 by grabbing the rear body panel 12 via the apertures 72. The apertures 72 are advantageously located near the center of gravity of the rear body panel 12 to thereby facilitate handling and carrying of the rear body panel 12.

As shown in FIG. 2, the rear body panel 12 also includes a trim edge 74 located a lower end of the seat support portion 38. The trim edge 74 is bulbous and extends outward from the lower edge of the seat support portion 38. Also, the trim edge 74 extends longitudinally from the side wall 20 to the front wall portion 24 and to the opposite side wall 20. The trim edge 74 is enlarged so as to overlap and hold down a floor mat (not shown) located in a foot well portion (not shown) of the golf car 10.

Moreover, the rear body panel 12 includes symbols 76 located over the wheel wells 29a, 29b. In the embodiment shown, the symbols 76 are alphanumeric symbols. More specifically, the symbols 76 spell "NO STEP" over the wheel wells 29a, 29b. Also, stiffening ribs 78 are located adjacent the symbols 76. The symbols 76 indicate that the surrounding surface should not be used to support a substantial load. The stiffening ribs 78 do provide some stiffening support (e.g., 300 lb capacity); however, the symbols 76 reduce the likelihood that the surface will be used to support a significant load. As such, the rear body panel 12 is less likely to be fractured.

As shown in FIG. 2, the rear body panel 12 includes at least one tab 80 extending from a lower end of the seat support portion 38. In the embodiment shown, there are a plurality of tabs 80 extending downward from the front wall portion 24 of the seat support portion 38. The tabs 80 are rectangular. The tabs 80 limit movement of the rear body panel 12 on the golf car 10 by extending into the floor board area (not shown) of the golf car 10.

Furthermore, the rear body panel 12 includes a plurality of side tabs 82 extending downward from the side wall 20 of the seat support portion 38. The side tabs 82 each are rectangular in shape, and include a corresponding aperture 84. The side tabs 82 allow for fixed attachment to the frame of the golf car 10. More specifically, a fastener (not shown) extends through the aperture 84 of each side tab 82 to thereby fix the rear body panel 12 to the golf car 10.

As shown in FIGS. 2 and 3, the bag well portion 30 includes a depression 86 located on the floor portion 36. The depression 86 is generally shaped to accommodate a plurality of golf bags (not shown). More specifically, the depression 86 includes a plurality of arcuate surfaces at the front and rear of the floor portion 36. Furthermore, the floor portion 36 includes a plurality of drain apertures 88 allowing for the drainage of water or other fluids and debris.

As shown in FIG. 1, the side walls 34 of the bag well portion 30 are each sloped outward so that a first distance D1 between a top of the side walls 34 is greater than a second distance D2 between a bottom of the side walls 34. In one embodiment the first distance D1 is at least 25% larger than the second distance D2. Accordingly, the outward slope of the side walls 34 allows for the bag well portion 30 to accommodate larger golf bags (not shown) with stuffed pockets and/or other larger cargo.

Figure 4:
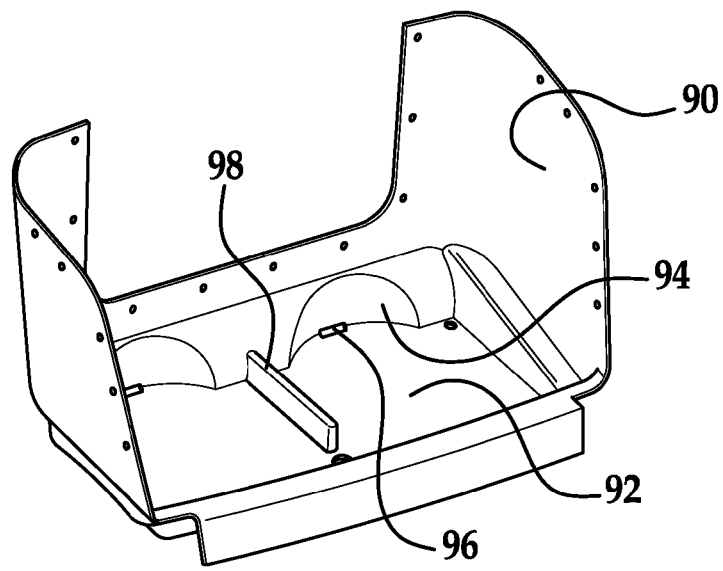
FIG. 4 is a perspective view of a bag well liner for the rear body panel of FIG. 1.

Furthermore, as shown in FIGS. 1 and 4 the bag well portion 30 can accommodate a bag well liner 90. The bag well liner 90 is a thin-walled member shaped correspondingly to the shape of the walls 32, 34 and floor portion 36 of the bag well portion 30. Moreover, the bag well liner 90 includes a floor portion 92 with a depression 94 that corresponds with the shape of the depression 86 of the bag well portion 30 of the rear body panel 12. Furthermore, the bag well liner 90 includes a plurality of drainage apertures 96 located according to the drainage apertures 88 of the rear body panel 12. Additionally, the bag well liner 90 includes a divider 98, which extends upward and divides the floor portion 92 approximately in half. The divider 98 provides some support to golf bags (not shown) stored on top of the bag well liner 90.

Figure 5:
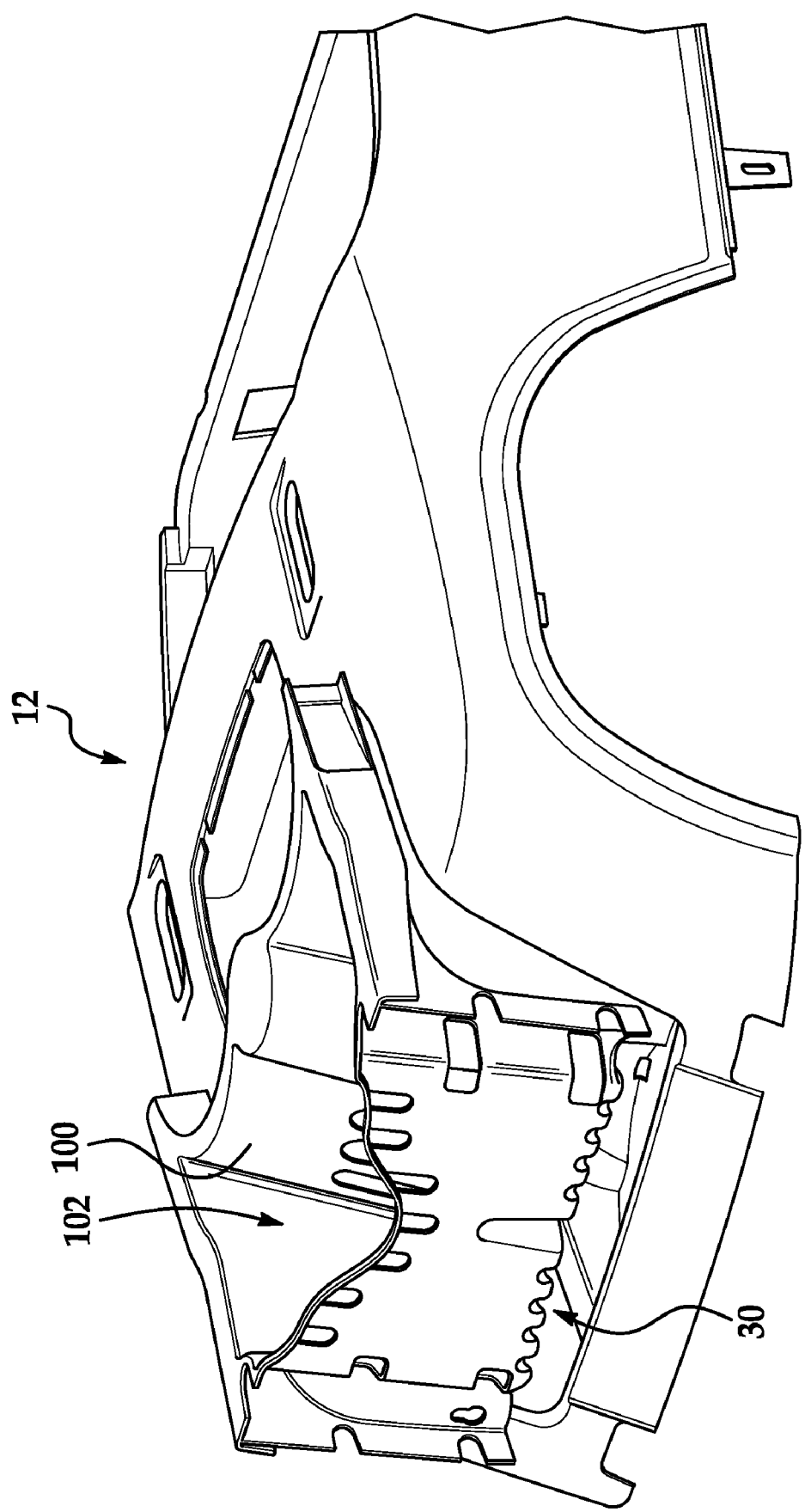
FIG. 5 is a perspective view of the rear body panel of FIG. 1 with a basket supported thereby.

Also, as shown in FIG. 5, the rear body panel 12 can accommodate a basket 100 in the bag well portion 30. The basket 100 can be of any suitable shape. In the embodiment shown, the basket 100 is hollow and box like with an open top end 102. The basket 100 can be used to hold cargo for transportation on the golf car 100.

The foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. A rear body panel for a golf car, comprising;
   a seat support portion;
   a bag well portion disposed rearward from said seat support portion; and
   a pair of wheel wells disposed on opposite sides of said bag well portion, wherein said bag well portion includes a front wall portion, a pair of side walls and a floor portion, said floor portion including an elongated opening therein, said elongated or opening providing impact absorption for the rear body panel.

2. The rear body panel according to claim 1, wherein said elongated opening is arcuate in shape.

3. The rear body panel according to claim 1, wherein said elongated opening has a length at least one half a width of said floor portion.

4. The rear body panel according to claim 1, further comprising a bag well liner received in said bag well portion.

5. A rear body panel for a golf car, comprising;
   a seat support portion;
   a bag well portion disposed rearward from said seat support portion;
   a longitudinal axis that extends from said seat support portion to said bag well portion; and
   a pair of wheel wells disposed on opposite sides of said bag well portion, wherein said bag well portion includes a front wall portion, a pair of side walls and a floor portion, said floor portion including an impact absorption feature therein, said impact absorption feature is transverse to said longitudinal axis and provides resilient deflection for impact absorption for the rear body panel.

6. The rear body panel according to claim 5, further comprising a bag well liner received in said bag well portion.

7. A rear body panel for a golf car, comprising;
   a seat support portion;
   a bag well portion disposed rearward from said seat support portion; and
   a pair of wheel wells disposed on opposite sides of said bag well portion, wherein said seat support portion includes an opening therein, said opening being partially surrounded by a recessed flange portion, said recessed flange portion being discontinuous at a rear portion of said opening.

8. A rear body panel for a golf car, comprising;
   a seat support portion;
   a bag well portion disposed rearward from said seat support portion; and
   a pair of wheel wells disposed on opposite sides of said bag well portion, wherein said seat support portion includes an opening therein, said opening including a recessed flange portion, said bag well portion and said recessed flange portion of said seat support portion include stiffening ribs at a location adjacent to each of said wheel wells.

9. A rear body panel for a golf car, comprising:
a forward seat support portion;
a rearward bag well portion disposed rearward from said seat support portion;
an intermediate body portion that is generally co-planar with said forward seat support portion and disposed between said seat support portion and said bag well portion; and
a pair of wheel wells disposed on opposite sides of said bag well portion, wherein said intermediate body portion includes at least one aperture sized for receiving a person's hand therein for facilitating handling of said rear body panel.

10. A rear body panel for a golf car, comprising;
a seat support portion;
a bag well portion disposed rearward from said seat support portion; and
a pair of wheel wells disposed on opposite sides of said bag well portion, wherein said bag well portion includes a front wall portion, a pair of side walls and a floor portion, wherein said sidewalls are each sloped outward so that a first distance between a top of said sidewalls is greater than a second distance between a bottom of said sidewalls, such that said first distance is at least 25 percent larger than said second distance.

11. A rear body panel for a golf car comprising:
a seat support portion;
a bag well portion that is disposed rearward from said seat support portion and includes a floor portion that has an elongated opening that provides impact absorption; and
a pair of wheel wells disposed on opposite sides of said bag well portion,
the seat support portion including a trim edge at a lower end thereof, the trim edge extending outward from the seat support portion.

12. A rear body panel for a golf car comprising:
a seat support portion;
a bag well portion disposed rearward from said seat support portion, said bag well portion includes a floor portion;
a longitudinal axis that extends from said seat support portion to said bag well portion;
an impact absorption feature in said floor portion, said impact absorption feature is transverse to said longitudinal axis; and
a pair of wheel wells disposed on opposite sides of said bag well portion,
the seat support portion including at least one tab extending downward from a lower end thereof for limiting movement of the rear body panel on the golf car.

* * * * *

UNITED STATES PATENT AND TRADEMARK OFFICE
CERTIFICATE OF CORRECTION

| | | |
|---|---|---|
| PATENT NO. | : 7,677,644 B2 | Page 1 of 1 |
| APPLICATION NO. | : 11/966301 | |
| DATED | : March 16, 2010 | |
| INVENTOR(S) | : Jing Wen et al. | |

It is certified that error appears in the above-identified patent and that said Letters Patent is hereby corrected as shown below:

Column 3, line 41, "well" should be --will--.

Column 6, line 21, "elongated or opening" should be --elongated opening--.

Signed and Sealed this

Twenty-ninth Day of June, 2010

David J. Kappos
*Director of the United States Patent and Trademark Office*